T. H. & D. T. WILLSON.
FODDER CUTTER.
No. 30,597. Patented Nov. 6, 1860
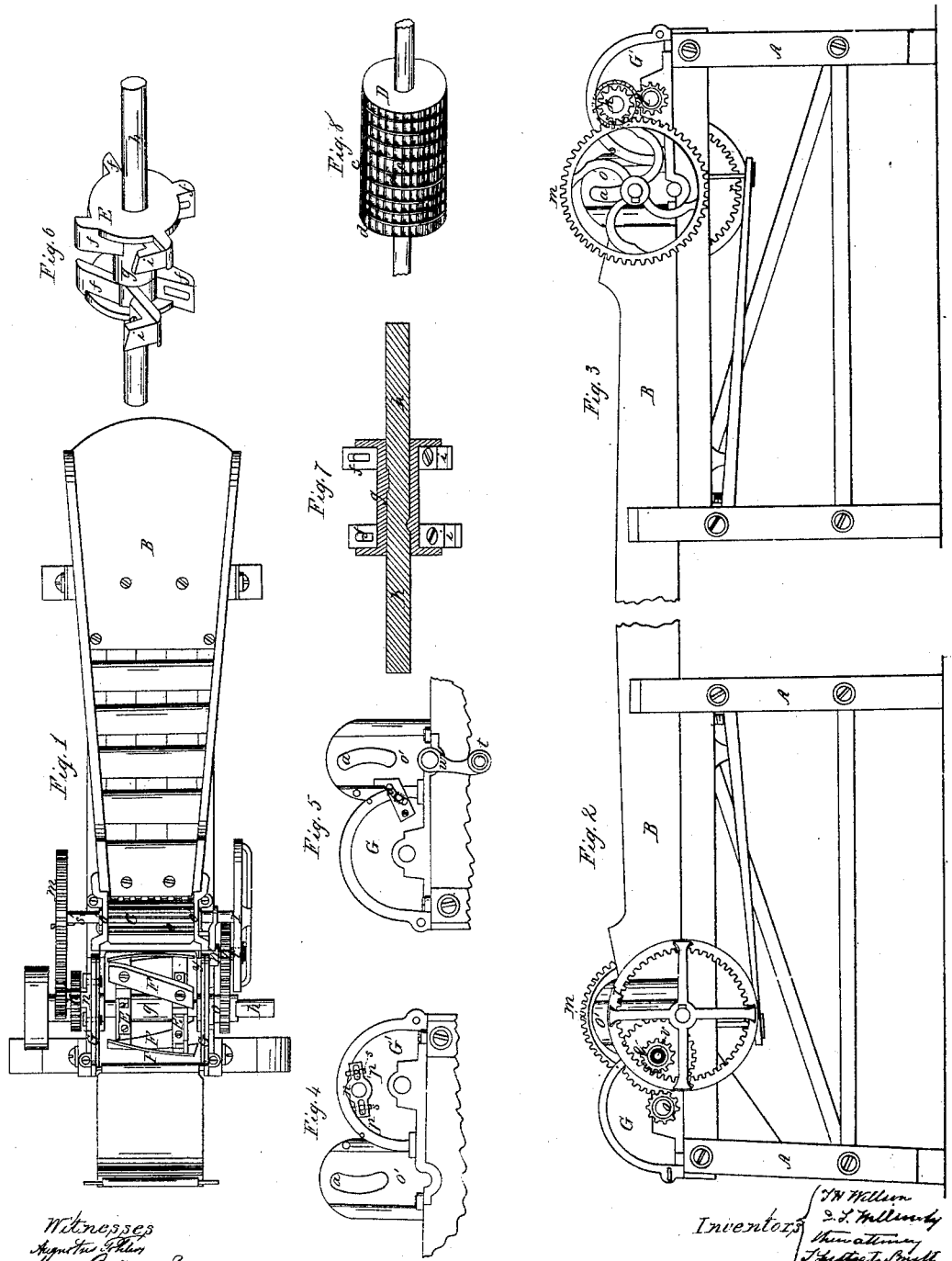

UNITED STATES PATENT OFFICE.

T. H. WILLSON AND D. T. WILLSON, OF HARRISBURG, PENNSYLVANIA.

MACHINE FOR CUTTING HAY, &c.

Specification of Letters Patent No. 30,597, dated November 6, 1860.

*To all whom it may concern:*

Be it known that we, T. H. WILLSON and D. T. WILLSON, of Harrisburg, Dauphin county, State of Pennsylvania, have invented certain new and useful Improvements in Fodder-Cutters, of which the following is a full, clear, and exact description, reference being had to the accompanying drawings, forming part of this specification, in which—

Figure 1 represents a plan of a fodder cutter embracing our improvements. Fig. 2 represents an elevation of one side of the machine. Fig. 3 represents an elevation of the opposite side. Fig. 4, represents an elevation of one side of the frame holding the cutter head and feed rollers with the outer gearing removed. Fig. 5, represents an elevation of the opposite side of the same frame. Fig. 6 represents a perspective view of the cutter head removed from the machine. Fig. 7 represents a longitudinal section of the same. Fig. 8 represents a perspective view of the lower feed roller.

It is well known that the slightest variation in the position of the spiral knives on the cutter head caused by either of the heads turning on the shaft or by both of them turning at the same time, changes the position of the edge of the knives in relation to the cutter bar, causing them to strike the cutter bar or be thrown off from it so that they will not cut the fodder. Hence it is very essential in that class of fodder cutters in which the spiral knife is used, that the two heads holding the knives should be so connected with each other, that the position of the seats of the knives, in the opposite heads, cannot be varied, as well as the position of the heads on the shaft; and also, that the position of the opposite seat for the knife in the two heads should exactly correspond with the angle and curvature of the knife. To effect this, is the object of one part of our invention; and our invention for effecting this object consists, in casting the two heads, containing the arms for supporting the opposite ends of the knives in one piece, connected rigidly with each other by a hollow sleeve, and at the same time cast on a wrought iron shaft; so that the position of the arms in relation to each other, as well as the position of the heads on the shaft, cannot be changed without breaking the heads. And it also consists in combining with this cutter head, adjustable knees arranged on the same side of the opposite arms, so as to diminish the strain on the holding bolts and so that the arms will resist the strain on the knees in the direction of the thrust of the knife while they support the under face of the knife.

The object of another part of our invention, is to prevent the loose fibrous material on the fodder, from being caught by the longitudinal ridges on the lower feed roller, and forced or carried by them, between the back of the cutter bar, and the surface of the feed roller; causing the cutter bar to spring outward against the edge of the knives; and our invention for effecting this object consists in combining with the longitudinal ribs, transverse ribs which form a network of recesses, on the surface of the roller and prevent the longitudinal ribs from catching the fibrous material and drawing it downward between the feed roller and back edge of the cutter bar while at the same time the recesses between the ribs form cups to receive and carry down the loose dirt which collects on the surface of the feed roller.

The object of another part of our invention—applicable to that class of machines, in which motion is communicated to all parts by means of gearing;—is, to so arrange the gearing and its connections, that the machine may be changed to vary the length of cut of the fodder with the greatest facility and without destroying or affecting the connection of the gears; and our invention for effecting this object consists, in slotting the stud plate carrying the gears, transmitting motion from the cutter head to the yielding feed roller in one direction; in connection with slotting the side plate to which the stud is bolted, at right angles to the slots in the stud plate by which means gears of different sizes, may be adjusted with perfect accuracy to transmit motion from the cutter head to the upper feed roller when required to change the length of cut of the fodder; and also in connection with the stud plate, in arranging the axis of the yielding feed roller to traverse in curved guides, which admit of its rising and falling, and still maintaining the teeth of different size wheels in gear so as to transmit motion without binding or getting out of gear when raising or lowering to suit the varying quantity of feed. And it also consists in arranging the gearing transmitting motion from the cutter head to the lower feed roller on a hollow stud attached to a radius bar, and clamped to the side plate by a bolt passing through a curved slot in the side plate, and through the hollow stud, the head of the bolt being on the inside of the plate, and the nut on the exterior, by which means the position of the stud may be adjusted for the different size gears required in varying the feed of the lower roller to change the length of cut, of the fodder. And it also consists in combining with the slotted movable stud plate a double pinion so arranged that by the movement of the stud either, one or both pinions are used to make the connection and thus convert the machine into a double or single geared machine as required in cutting the fodder into long or short pieces, and without additional gearing.

In the accompanying drawings is represented a fodder cutting machine, embracing our improvements, which consists of a frame (A) to hold a feeding trough (B) and support the moving parts; and these parts consist of a yielding upper feed roller (C), a lower feed roller (D), and a cutter head (E), armed with spiral knives (F). The shaft ($s'$) of the upper feed roller traverses in curved guides ($a$) formed in the side plates ($o'$ $o'$) of the machine, and the surface of the roller is armed with longitudinal ribs ($b$) to increase its adhesion to the material.

The axis ($n'$) of the lower feed roller (D) has its bearings in fixed boxes in the bed plates, and the surface of the roller is furnished with longitudinal ribs, ($c$) and transverse ribs ($d$) crossing each other, and both at the same level, forming a net-work of cells to receive the dirt accumulating on the surface of the roller and rendering the surface more adhesive than a smooth roller.

The cutter head (E) consists of two sets of radial arms ($f$) connected together by a hollow sleeve ($g$) all of which, are cast in one piece and at the same time cast on a wrought iron axle, ($h$) which is indented or cut out at several points, to prevent the head turning or changing its position on the shaft. The distances between the two sets of radial arms or heads correspond with the length of the knives; and the relation the opposite arms in the two heads bear to each other, and to the axis of the head, corresponds precisely with the angle of the spiral knife. These arms are provided with adjustable knees ($i$) to support the under side of the knife and also so that its distance from the axis of the cutter head may be adjusted to correspond with the curvature of the face of the knife. These knees are arranged on the front side or opposite arms with slots in the arm, or knees, for bolts so they can be adjusted to make the knife fit the cutter bar.

The feed rollers are driven from the cutter head shaft through a train of gearing, the lower roller being driven from one end of this shaft, and the upper roller from the opposite end. A double pinion ($k$) forms the connection between a toothed wheel ($l$) on one end of the cutter head, and a toothed wheel ($m$) on the end of the upper feed roller shaft. This pinion turns on a stud, the plate ($n$) of which has longitudinal slots ($p$) cut through it, and the side plate (G) to which the stud is attached is also provided with slots at right angles to the slots ($p$), so that the bolts by which the stud is attached to the side plate pass through the slots in both plates, and thus admit of the stud being moved upward or outward on the side plate. By thus arranging the stud and side plate the position of the stud may be adjusted for different size pinions, to connect and transmit motion from the cutter head, to the upper feed roller. This double pinion ($k$) is so proportioned that when both wheels of the pinion form the connection, the sliding of the stud plate, and moving the wheel on the shaft of the upper feed roller, serves to form the connection between the cutter shaft, and upper feed roller with one pinion alone, and thus, without the aid of spare gearing, either a double or single geared connection is made.

The shaft of the yielding roller plays in curved guides ($a$) the center of whose radius of curvature is above the center of the shaft, and the center of the shaft when in its normal position is some distance below the stud carrying the pinions communicating motion to it from the cutter head, so that different size pinions may be used on the stud to vary the velocity of the feed roller, and still the feed roller gear maintain its connection with the intermediate pinion, while at the same time it is free to vibrate in its guides without causing the gearing to bind, or become disconnected. Motion is communicated from the opposite end of the cutter shaft to the lower feed roller by means of a toothed wheel ($o$) on the cutter shaft and an intermediate double pinion ($q$) which gears into an interior toothed wheel ($r$) fixed to the shaft of the lower feed roller. This double pinion ($q$) turns on a hollow stud ($t$) affixed to a radius bar ($w$) which is pivoted to the lower feed roller shaft. The hollow stud is attached to the side plate (G) by means of a screw bolt ($v$) which passes through the stud, and through a curved slot ($u$) in the plate. The bolt head ($y$) is on the inside of the plate and the tightening nut on the outside, which allows the stud and the double pinion to be adjusted for different size toothed wheels on the cutter head, without interfering with the cutter head or knives.

It will be seen that in casting the two sets of arms for the support of the cutters with a connecting sleeve, all in one piece, and at the same time casting it on a wrought iron shaft, that neither the position of the arms in relation to each other, or the position of the head on the wrought iron shaft can be changed without breaking the parts; thus a cheaper, better, and more durable cutter head is made, than heretofore.

The transverse ribs on the lower feed roller prevent the lint or loose fiber of the fodder, from winding around, and retaining a firm hold on the longitudinal ribs, so as to be carried down by them, between their edges and the back of the cutter bar, causing the cutter bar to spring outward against the edge of the knives.

Having thus described our improvement in fodder cutters, what we claim therein as new and desire to secure by Letters Patent is—

1. Casting a cutter head composed of two sets of radial arms, united by a sleeve all in one piece, and around a wrought iron axle, substantially as described, for the purpose set forth.

2. The combination of the cutter head with adjustable knees, when arranged on the face of both sets of arms, substantially as described, for the purpose set forth.

3. Constructing the lower feed roller with transverse and longitudinal ribs upon its surface, for the purpose set forth.

4. Attaching the stud carrying the intermediate pinion ($k$) to the side plate (G) substantially in the manner described for the purpose set forth.

5. Constructing the guides of the feed roller shaft with a curved slot as described, in connection with the stud plate arranged as described.

6. Arranging the intermediate double pinion ($q$) on an adjustable stud and supporting said stud by means of a radius bar ($w$) pivoted to the shaft of the feed roller, substantially as herein described for the purpose set forth.

7. The combination of the slotted stud plate with the double pinion, arranged as described for the purpose set forth.

In testimony whereof we have subscribed our names.

T. H. WILLSON.
D. T. WILLSON.

Witnesses:
  Henry Beader,
  W. B. Mann.